US007084417B2

(12) United States Patent
Lee

(10) Patent No.: US 7,084,417 B2
(45) Date of Patent: Aug. 1, 2006

(54) POSITIONING STRUCTURE OF PLANE IMAGE INPUT APPARATUS

(75) Inventor: Shih-Yang Lee, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 134 days.

(21) Appl. No.: 10/765,968

(22) Filed: Jan. 29, 2004

(65) Prior Publication Data

US 2005/0167579 A1 Aug. 4, 2005

(51) Int. Cl.
*G01N 21/86* (2006.01)
*H04N 1/46* (2006.01)
*H04N 1/00* (2006.01)

(52) U.S. Cl. ................ 250/559.1; 250/239; 250/208.1; 358/504; 358/406; 358/518

(58) Field of Classification Search ................ 250/559, 250/1, 234, 235, 239, 208.1, 226; 358/406, 358/504
See application file for complete search history.

(56) References Cited

U.S. PATENT DOCUMENTS 6,515,771 B1 * 2/2003 Sato .......................... 358/3.26
2003/0111587 A1 * 6/2003 Chen et al. .............. 250/208.1
2004/0207886 A1 * 10/2004 Spears ........................ 358/474

* cited by examiner

*Primary Examiner*—Thanh X. Luu
*Assistant Examiner*—Stephen Yam
(74) *Attorney, Agent, or Firm*—Birch, Stewart, Kolasch & Birch, LLP

(57) ABSTRACT

A positioning structure of plane image input apparatus comprises a hollow body, carrying scanned documents and setting a correct picture on outer and inner opposite sides, and an optical module inside the body moving back and forth. The optical module has a correct light source to emit light, a correct hole for reflect light passing through and propagating to the optical module, a guiding mirror set to guide light, and a charge couple device to receive light. The correct light source and the correct hole are respect to the correct picture side of the body. After reflected by the correct picture, light passes the correct hole, to the optical module and is guided by the guiding mirror set to the charge couple device for the optical module to correct color rank and to position. Thus, the positioning structure improves accuracy of correcting color rank and positioning of the correct picture.

9 Claims, 2 Drawing Sheets

POSITIONING STRUCTURE OF PLANE IMAGE INPUT APPARATUS

FIELD OF THE INVENTION

The present invention relates to a positioning structure adopted for use on a plane image input apparatus and particularly to a positioning structure for improving accuracy of correcting color rank and positioning of the correct picture.

BACKGROUND OF THE INVENTION

Referring to FIGS. 1 and 2, a conventional scanner includes a lid 10, a scanner body 20 and a printed circuit board (PCB) 30. The lid 10 is for flattening a scanned document 70. The scanner body 20 houses the main mechanisms of the scanner, including a transmission mechanism 21, an optical module 22 and a guiding track 23. The transmission mechanism 21 drives the optical module 22 moving reciprocally along the guiding track 23. The optical module 22 includes a light source 221, a reflecting mirror set 222 and a charge-coupled device (CCD) 223. The light source 221 emits light and projects the light to the scanned document 70. The scanned document 70 reflects the light to the reflecting mirror set 222, which reflects the light to the CCD 223. The PCB 30 receives a driving signal and drives the transmission mechanism 21, to move the optical module 22 reciprocally along the guiding track 23 in the scanner body 20. Meanwhile, the optical module 22 reads the scanned document 70 during the scanning movement to obtain image signals. The image signals are transformed to digital signals, which are transferred to a computer or printing equipment to output, store or process.

While the optical module 22 is moving reciprocally along the guiding track 23, it is also reading a correct picture 80, located on an upper side of the scanner body 20 to correct the color rank of the scanner, and perform positioning through selected patterns of the correct picture 80. However, due to space constraint on the upper side of the scanner, when the scanner document 70 has the selected patterns of the correct picture 80, positioning might fail.

Beside the scanner, copiers also use the correct picture 80 to perform correction of color, rank and positioning. Those types of plane image input apparatus all have the same problem.

SUMMARY OF THE INVENTION

Therefore, the primary object of the present invention is to provide a positioning structure of a plane image input apparatus to improve accuracy of correcting color rank and positioning of the correct picture.

The positioning structure of a plane image input apparatus according to the invention includes a body and an optical module. The body has a hollow interior and has an outer side on one side holding a scanned document. The body has another side holding a correct picture on an inner side thereof. The optical module is located in the hollow interior and movable reciprocally. The optical module includes a correct light source for emitting light, a correct hole for reflecting the light into the optical module, a guiding mirror set for directing the light and a CCD for receiving light. The correct light source and the correct hole are located on another side of the body.

By means of the construction set forth above, when the optical module is moved to the correct light source corresponding to the correct picture, light emitted from the correct light source projects to the correct picture, and is reflected to the correct hole and enters the optical module. The guiding mirror set directs the light to the CCD for the optical module to perform correction of color rank and positioning, thereby improving accuracy of correcting color rank and positioning of the correct picture.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
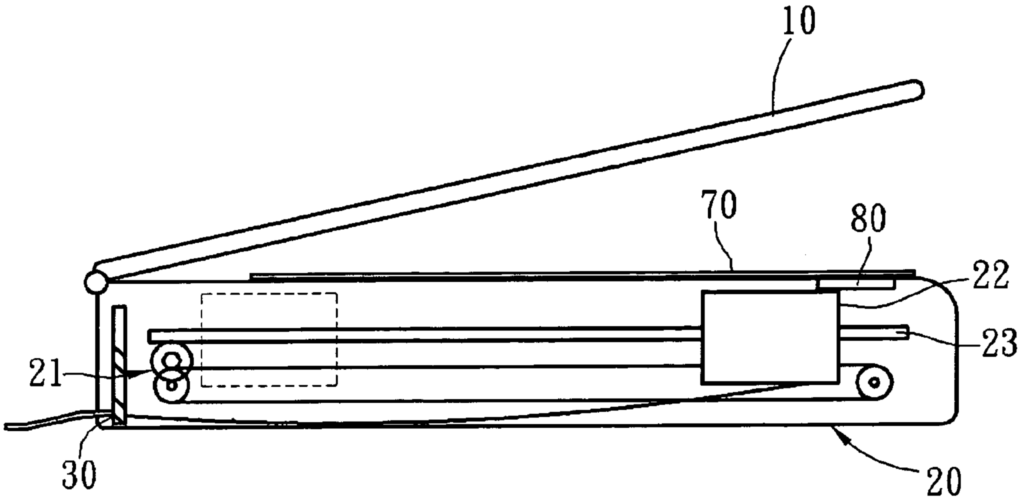
FIG. 1 (PRIOR ART)
FIG. 1 is a schematic view of a conventional scanner.
Figure 2:
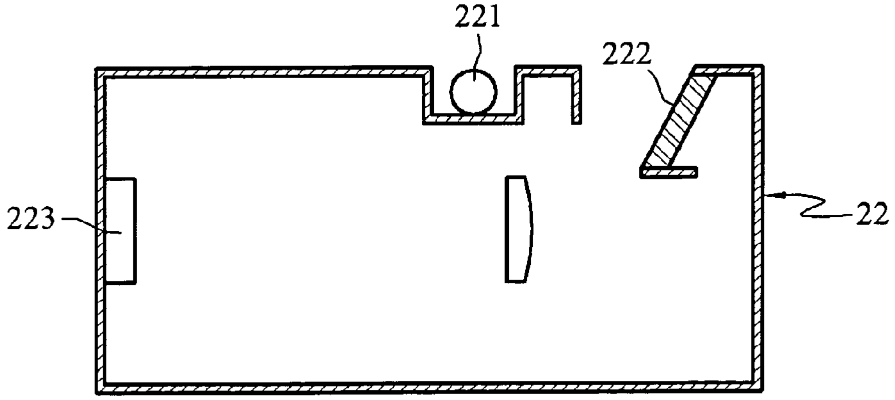
FIG. 2 (PRIOR ART)
FIG. 2 is a schematic view of the optical module of a conventional scanner.
Figure 3:
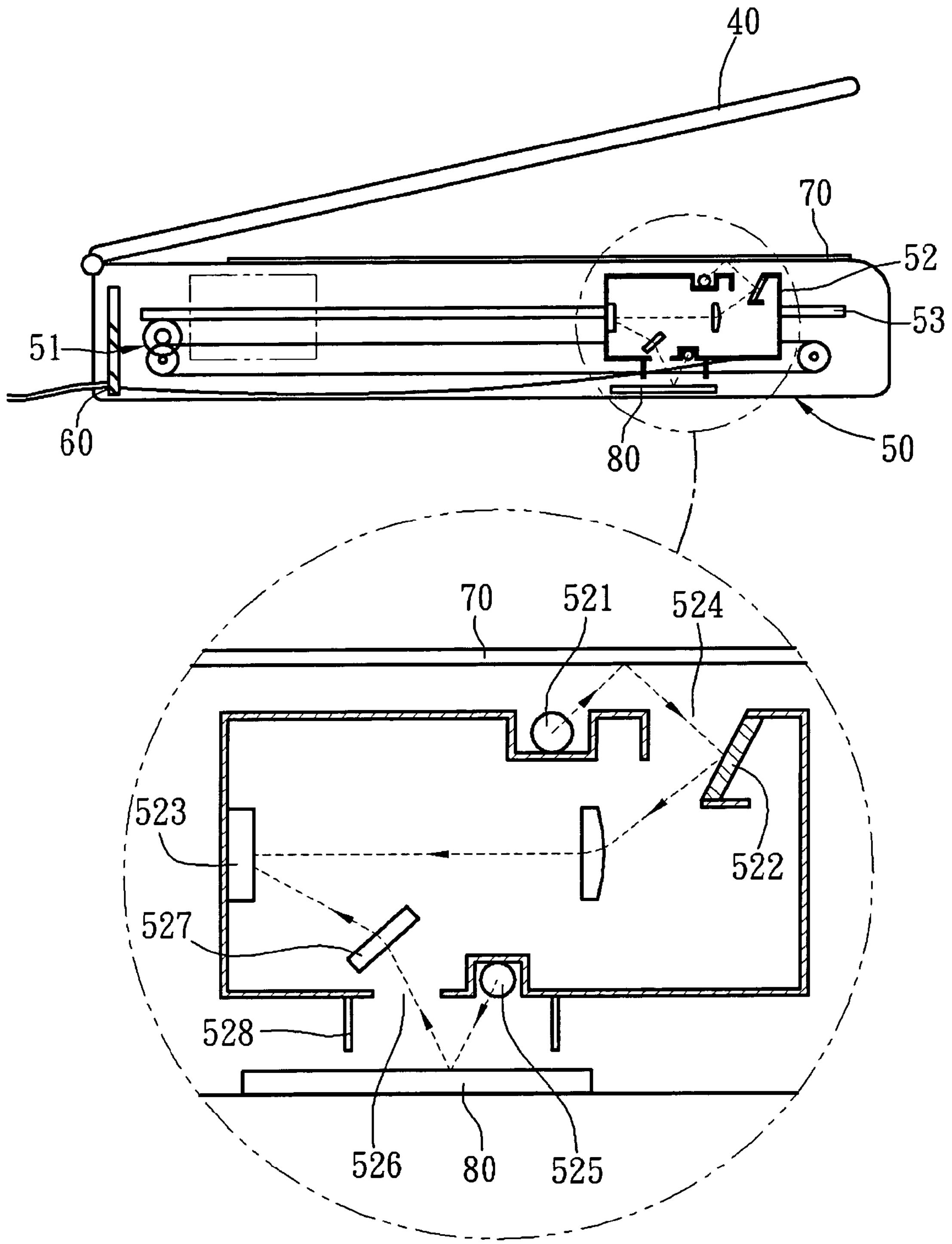
FIG. 3 is a schematic view of the invention.

Referring to FIG. 3, the positioning structure of a plane image input apparatus according to the invention includes a lid 40, a body 50 and a printed circuit board (PCB) 60. The lid 40 is located on an outer side of one side of the body 50 for flattening a scanned document 70. The body 50 has a hollow interior to house the main mechanisms of the scanner, including a transmission mechanism 51, an optical module 52 and a guiding track 53. The scanned document 70 is located on the outer side of one side the body 50. The body 50 has another side holding a correct picture 80 therein. The transmission mechanism 51 drives the optical module 52 to move reciprocally along the guiding track 53. The optical module 52 includes a scan light source 521, a scan hole 524, a reflecting mirror set 522 and a charge-coupled device (CCD) 523. The scan light source 521 is located on the one side of the scanner corresponding to the scanned document 70. It emits light and projects the light to the scanned document 70. The scanned document 70 reflects the light to the reflecting mirror set 522 located in the optical module 52 through the scan hole 524. Then the light is reflected to the CCD 223. The PCB 60 receives a driving signal and drives the transmission mechanism 51 to move the optical module 52 reciprocally along the guiding track 53 in the scanner body 50. Meanwhile, the optical module 52 reads the scanned document 70 during the scanning movement to obtain image signals. The image signals are transformed to digital signals, which are transferred to a computer or printing equipment to output, store or process.

The optical module 52 further includes a correct light source 525, a correct hole 526, and a guiding prism set 527. The correct light source 525 emits light. The correct hole 526 allows reflecting light to enter the optical module 52. The guiding prism set 527 directs the light. The correct light source 525 and the correct hole 526 are located on another side of the body (where the correct picture 80 is located). When the correct light source 525 of the optical module 52 is corresponding to the correct picture 70, the correct light source 525 emits light and projects the light to the correct picture 80, the light is reflected and enters the optical module 52 through the correct hole 526. The guiding prism set 527 directs the light to the CCD 523, to perform color rank correction and positioning.

To prevent external light from entering the optical module 52 through the correct hole 526 and creating interference, a masking element 528 may be provided in the optical module

52. The masking element 528 is corresponding to the correct light source 525 and has one end abutting the body 50.

By means of the positioning structure of the invention, when the optical module 52 is moved to the correct light source 525 corresponding to the correct picture 80, light emitted from the correct light source 525 is projected to the correct picture 80, and reflected through the correct hole 526 to enter the optical module 52. The guiding prism set 527 directs the light to the CCD 523 for the optical module 52 to perform color rank correction and positioning. The masking element 528 can prevent external light other than the correct light source 525 from entering the optical module 52 through the correction hole 526 and creating interference. Therefore the invention can improve the accuracy of correcting color, rank and positioning of the correct picture.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What is claimed is:

1. A positioning structure of a plane image input apparatus, comprising:

a body, having a hollow interior, having an outer upper side for holding a document to be scanned, and having an inner bottom side holding a correct picture therein; and an optical module, located in the hollow interior, movable reciprocally, and including a correct light source for emitting light, a correct hole for reflecting the light to the optical module, a guiding prism set for directing the light and a charge-coupled device for receiving the light, the correct light source and the correct hole being located on the inner bottom side of the body, the correcting light source emitting the light to the correct picture when the optical module is corresponding to the correct picture, the light being reflected to the optical module through the correct hole, the guiding prism set directing the light to the charge-coupled device for the optical module to perform color rank correction and positioning.

2. The positioning structure of claim 1, further having a masking element corresponding to the correct light source, the masking element having one end extending toward the inner bottom side of the body to prevent external light from entering the optical module through the correct hole.

3. The positioning structure of claim 1, wherein the optical module includes a scan light source, a scan hole and a reflecting mirror set, the scan light source being located on one side of the body to emit light to the scanned document, the light entering the optical module through the scan hole to be reflected by the reflecting mirror set to the charge-coupled device to obtain image signals.

4. The positioning structure of claim 1, further having a printed circuit board for receiving a driving signal and driving.

5. The positioning structure of claim 4, further having a transmission mechanism for driving the optical module when the printed circuit board is driving.

6. The positioning structure of claim 5, further having a guiding track to guide the optical module to move reciprocally.

7. The positioning structure of claim 1, further having a lid to cover the outer side of the body.

8. The positioning structure of claim 3, wherein the scan hole and the correct hole are at different locations of the optical module.

9. The positioning structure of claim 3, wherein the scan light source and the correct light source are at different locations of the optical module.

* * * * *